United States Patent [19]

Alia

[11] 4,161,419
[45] Jul. 17, 1979

[54] PRODUCTION OF COATED ELECTRICAL CONDUCTOR CABLE

[75] Inventor: Dominic A. Alia, Williamsport, Pa.

[73] Assignee: Alcan Aluminum Corporation, Cleveland, Ohio

[21] Appl. No.: 856,483

[22] Filed: Dec. 1, 1977

Related U.S. Application Data

[63] Continuation of Ser. No. 666,744, Mar. 15, 1976, abandoned.

[51] Int. Cl.$^2$ ............................................. H01B 13/14
[52] U.S. Cl. ................................. 156/51; 156/244.12; 174/110 AR; 174/110 PM; 260/42.56; 427/120
[58] Field of Search .................. 156/51, 244; 427/117, 427/119, 120, 358; 260/897 A, 42.56; 174/110 R, 110 AR, 110 SR, 110 PM

[56] References Cited

U.S. PATENT DOCUMENTS

| | | | |
|---|---|---|---|
| 2,462,977 | 3/1949 | Kitchin et al. | 117/138.8 |
| 2,993,019 | 7/1961 | Snyder | 260/28.5 |
| 3,700,753 | 10/1972 | Terada et al. | 260/876 B |
| 3,749,817 | 7/1973 | Shiga et al. | 174/102 SC |
| 3,936,572 | 2/1976 | MacKenzie et al. | 428/379 |

FOREIGN PATENT DOCUMENTS 48-18934 6/1973 Japan ...................................... 260/42.56

Primary Examiner—George F. Lesmes
Assistant Examiner—Bruce H. Hess
Attorney, Agent, or Firm—Cooper, Dunham, Clark, Griffin & Moran

[57] ABSTRACT

A method of producing electrical conductor cable having a polyethylene-based coating, wherein additive material such as a filler is first mixed with a vehicle including an ethylene propylene rubber to provide a homogeneous concentrate, and the concentrate is then blended with polyethylene to constitute a coating composition for application to a cable as by extrusion. The concentrate-polyethylene blending step may be performed by the pumping screw of a cable-coating extruder.

10 Claims, 2 Drawing Figures

PRODUCTION OF COATED ELECTRICAL CONDUCTOR CABLE

This is a continuation of application Ser. No. 666,744, filed Mar. 15, 1976, now abandoned.

BACKGROUND OF THE INVENTION

This invention relates to methods of producing polyethylene-based coatings for electrical conductor cable, and in particular to new and improved ways of preparing polyethylene-based compositions such as are used to coat cable, as well as to intermediate compositions having utility therefor.

For purposes of illustration, detailed reference will be made herein to the provision of electrically insulating coatings for cable, as representing one important field of use of the type of polyethylene-based compositions with which the invention is concerned. It will be understood that the term "cable" embraces both single- and multi-strand metal electrical conductors, regardless of gauge or cross-sectional shape.

A typical conventional polyethylene-based cable-coating composition comprises a major proportion of polyethylene and minor proportions of other ingredients (herein collectively termed "additive material") such as fillers, anti-oxidants, and cross-linking agents. The polyethylene content may be a homopolymer, or a copolymer with a minor amount (e.g. about 11% by weight) of ethylene vinyl acetate; the term "polyethylene" is used herein generically to designate both homopolymers of polyethylene, and copolymers of a major proportion of polyethylene and a minor proportion of ethylene vinyl acetate. Commonly, the principal additive is the filler; nonconductive carbon black is frequently preferred as a filler, because it affords a measure of protection against ultraviolet radiation, but other solid particulate fillers such as clays are also sometimes used.

In present-day commercial practice, a coating composition as described above is ordinarily prepared by mixing all the ingredients together (at a temperature at which the polyethylene is fluid) in heavy-duty mixing equipment of the type known as a Banbury mixer, which is capable of providing the high mechanical shear mixing action conventionally needed to blend particulate fillers and/or other additive material in polyethylene, i.e. for attainment of the high degree of homogeneity required for cable coating compositions. The composition is screened after mixing to remove any unblended material. If a cross-linking agent is used, it is added to the composition in a second mixing step (also conventionally performed in a Banbury mixer, although high shear is not required) after the other ingredients have been blended, because the high temperature developed in initially mixing ingredients such as particulate fillers with polyethylene would result in premature curing if the cross-linking agent were then present. Finally, the fully-mixed composition is pelletized and delivered to extruding apparatus having a screw-type pump which forces the composition at elevated temperature through a die in surrounding relation to an advancing cable so as to coat the cable surface; in cases where a cross-linking agent is used, the coating is subsequently cured by passing the coated cable through a curing chamber such as a steam tube.

The step of fully premixing the entire coating composition in a Banbury mixer before the composition is supplied to an extruder contributes significantly, and undesirably, to the overall expense of producing polyethylene-based cable coatings, owing to the high capital and operating costs of such mixing equipment. The requirement that the coating composition be very homogeneously blended, and the difficulty of mixing additive material with polyethylene in conventional practice, however, have heretofore necessitated use of that mixing step; for example, the pumping screw of an extruder (which is designed to pump rather than to mix) is not capable of adequately blending a conventional polyethylene-based cable-coating composition. Thus, in current practice, a coated-cable producer must either invest in or rent large-capacity Banbury mixers, or else purchase his requirement of premixed coating composition from a mixer-supplier; in the latter case, all the polyethylene used in the composition must be shipped first to the mixer-supplier from a polyethylene producer, and then (as fully mixed coating composition) shipped to the coated-cable producer from the mixer-supplier, with attendant high freight costs. For reasons of economy as well as operating convenience, it would be desirable to reduce the amount of material required to be treated in a Banbury mixer for production of a given quantity of cable coating, if that could be done without sacrifice of the requisite homogeneity of blending.

SUMMARY OF THE INVENTION

The present invention embraces the discovery that in procedure for coating electrical conductor cable, a minor proportion of particulate solid filler and/or other additive material can be homogeneously blended in a major proportion of polyethylene with greatly enhanced facility, and without high mechanical shear mixing, if the additive material is first mixed with a carrier comprising an ethylene propylene rubber to produce a homogeneous concentrate or master batch, and the master batch is then added to the aforementioned major proportion of polyethylene. In particular, applicant has discovered that fully adequate blending of the described master batch and the bulk of the polyethylene used in a cable-coating composition can be performed directly by the pumping screw of a conventional extruder employed to apply the composition to a cable; thus the bulk of the polyethylene, ordinarily constituting at least about 50% (and frequently even more than 60%) of the final coating composition, can be supplied directly to the extruder screw without ever passing through a Banbury mixer or other pre-mixing equipment. Although the master batch is itself preferably mixed in a Banbury mixer or the like, this great reduction in the amount of material treated by a Banbury mixer for production of a given quantity of final coating composition (as compared with prior practice) affords very significant savings in the overall cost of producing polyethylene-based cable coatings, notwithstanding that the relatively small amount of ethylene propylene rubber used may have a somewhat higher material cost than an equivalent amount of polyethylene.

It will be understood that all ratios, percentages and proportions set forth herein are expressed in terms of weight unless otherwise specifically indicated.

In a broad sense, then, the invention contemplates a method of preparing a mixture of polyethylene and additive material including the steps of mixing the additive material with a vehicle comprising an ethylene propylene rubber to produce a homogeneous master batch, and thereafter blending the master batch with at least a major proportion of the polyethylene to be included in the final mixture, both the initial mixing and final blending steps being performed at elevated temperatures at which the polymeric materials present (ethylene propylene rubber and polyethylene) are "fluid," viz. amorphous and flowable under the forces exerted by the mixing or blending equipment used, so as to enable attainment of homogeneity of mixing or blending in the product. The mixing step is advantageously performed in a Banbury mixer or the like to achieve assured homogeneity of the master batch, while the blending step may be performed by an extruder screw, i.e. incident to an extruding operation. In this broad sense, the invention has application to the production of a wide variety of polyethylene-based articles such as extruded or injection-molded tubes, gaskets, etc., as well as cable coatings, affording generally the advantage of obviating use of heavy-duty mixing equipment such as a Banbury mixer for blending the bulk of the polyethylene with the additive material employed. The foregoing mixing and blending steps may thus be combined with a further step of shaping the blended composition into a desired form, and the blending step may be performed incident thereto, i.e. while the master batch and polyethylene are being fed in fluid state to a die or mold for the shaping step.

The invention is broadly applicable to the incorporation, in polyethylene, of additive materials generally, including both liquids and divided solids, as well as initially solid materials that become liquid at temperatures at which polyethylene is fluid. In one specific aspect, the invention affords particular advantages for achieving a uniform or homogeneous dispersion of particulate solid material (e.g. particulate solid fillers such as carbon black, which are essentially inert with respect to polyethylene and remain solid at the temperatures encountered in the processing operations herein contemplated) in polyethylene. That is to say, whereas uniformity of dispersion of such inert solid particles in polyethylene has heretofore required subjection of all the polyethylene as well as all the particulate solid additive to the high mechanical shear mixing action of a Banbury mixer, the present invention enables attainment of highly uniform dispersion of particles, even in compositions having a high (e.g. 30%) loading of filler, without ever passing the bulk of the polyethylene through a Banbury mixer.

Stated with further reference to cable-coating operations, a method of coating cable in accordance with the invention comprises the steps of blending polyethylene with a pre-established homogeneous master batch mixture of additive material and a vehicle comprising an ethylene propylene rubber while the polyethylene and master batch vehicle are fluid, and coating a cable surface with the resultant blended composition. The coating step may be performed by a conventional cable-coating extruder having a screw-type pump, and the blending step may be performed by delivering pellets of solid unblended polyethylene and pellets of solid master batch together to the screw; the heat and mechanical action to which the pellets are subjected in the screw pump, incident to the extruding operation, effect the requisite blending so as to provide a satisfactorily homogeneous coating composition at the extruder die orifice.

The above-mentioned advantages of the invention, with respect to ease of final blending, are at present believed attributable to some effect of the ethylene propylene rubber content of the master batch in enhancing the viscosity, and consequently improving the shearing characteristics, of the polymeric carrier material (which is predominantly polyethylene) in the master batch-polyethylene mixture, when the master batch vehicle and polyethylene are fluid. To achieve these results, i.e. to enable adequately homogeneous blending of master batch and polyethylene with an ordinary extruder screw or the like, the specified sequence of steps is critically important; in other words, it is essential that the filler and/or other additive material be established in a homogeneous master batch mixture with the master batch vehicle including ethylene propylene rubber before being introduced to the bulk of the polyethylene.

As used herein, the term "ethylene propylene rubber" (EPR) includes both ethylene-propylene copolymers and terpolymers of ethylene and propylene with a diene, such terpolymers being commonly known by the designation EPDM. For the purposes of the present invention, the ethylene propylene rubber employed must have the requisite dispersion characteristics (shear properties) and must be miscible with polyethylene. Specifically, it is found that ethylene propylene rubbers having an ethylene content greater than 50% by weight possess this combination of properties and are suitable for use in the practice of the invention. These ethylene-propylene rubbers also have satisfactory electrical properties for inclusion in insulating coatings for cable.

The additive material incorporated in the master batch may comprise particulate solids such as carbon black or other fillers which are to be dispersed in polyethylene, and/or other ingredients, e.g. anti-oxidants and processing, coloring, and cross-linking agents. Preferably, the vehicle of the master batch is a mixture of an ethylene propylene rubber and polyethylene. The ratio of additive material to ethylene propylene rubber in the master batch may be as high as 5:1, and for reasons of economy, is desirably at least about 2:1; stated more broadly, a satisfactory range for the ratio of additive material to ethylene propylene rubber by weight, is between about 1:1 and about 5:1. Larger proportions of vehicle (including substantial amounts of polyethylene) may be incorporated in the master batch; however, since the master batch is mixed in a Banbury mixer or the like while the subsequent step of blending the master batch with additional polyethylene may be performed by an extruder screw, it is generally advantageous to minimize the amount of material subjected to the master batch mixing step. Thus, referring to operations wherein the master batch vehicle is a combination of an ethylene propylene rubber and polyethylene, the polyethylene content of such vehicle preferably constitutes only a small fraction of the total polyethylene to be included in the final composition. Stated more generally, for realization of the economic advantages of the invention, the master batch vehicle constitutes a minor proportion, and the polyethylene added in the blending step constitutes a major proportion, of the polymeric carrier in the ultimate composition. Indeed, the master batch including the additive material as well as the vehicle ordinarily constitutes less than half the final composition.

When a cross-linking agent is included in the master batch, it may be added thereto after the other additive material has been mixed with the vehicle, i.e. in a second master batch mixing operation also performed in a Banbury mixer, to avoid premature curing such as might occur if the cross-linking agent were present in the first mixing step, in which relatively high temperatures are developed. Alternatively, the cross-linking agent may be mixed separately with an ethylene propylene rubber vehicle to constitute a second master batch for delivery in pelletized form, together with pellets of the principal master batch and pellets of polyethylene, to an extruder screw for the final blending step. Mixing of a cross-linking agent with a pre-established master batch or with an ethylene propylene rubber vehicle does not result in premature curing because it blends relatively easily with the vehicle, so that the mixing action required does not raise the material temperature into the curing range; however, it is found that the cross-linking agent must be mixed with a master batch or EPR vehicle prior to introduction to an extruder screw because unmixed cross-linking agent tends to lubricate the screw surfaces and thus to interfere with proper pumping action of the screw.

The invention may also be embodied in procedures for making polyethylene-based products (e.g. cable coatings) which are not cross-linked; for such operation, the cross-linking agent is simply omitted.

Referring again specifically to the coating of cable, one additional advantage of the invention is that a coated-cable producer who has no special mixing facilities can purchase his requirements of master batch from a mixer-supplier, and obtain the bulk of the polyethylene he uses directly from a polyethylene producer for blending with the master batch in his existing extruder equipment, thereby avoiding the freight costs that have heretofore resulted from shipment of the bulk of the polyethylene first to the mixer-supplier and then to the cable producer, i.e. when (as is commonly the case) the polyethylene producer, mixer-supplier and cable producer are located at substantial distances from each other.

In a further aspect, the invention embraces the provision of master batch compositions comprising, in homogeneous mixture, carbon black and a polymeric vehicle comprising an ethylene propylene rubber, wherein the ratio of carbon black to EPR is at least about 2:1 (or more, e.g. even as high as about 5:1), in parts by weight. Ethylene propylene rubbers having an ethylene content of at least about 50% by weight are suitable for use in the compositions of the invention. The vehicle may, for example, consist essentially of a major proportion of such EPR and a minor proportion of polyethylene. Such compositions have utility as the master batches in the above-described method. Preferably, these master batches are essentially free of oil, and especially for mixture with polyethylene in an extruder screw or the like they should contain no more than about 5% oil at most, as the softening or lubricating effect of oil impairs effectiveness of mixing action by an extruder screw.

Further features and advantages of the invention will be apparent from the detailed description hereinbelow set forth, together with the accompanying drawing.

DETAILED DESCRIPTION

Figure 1:
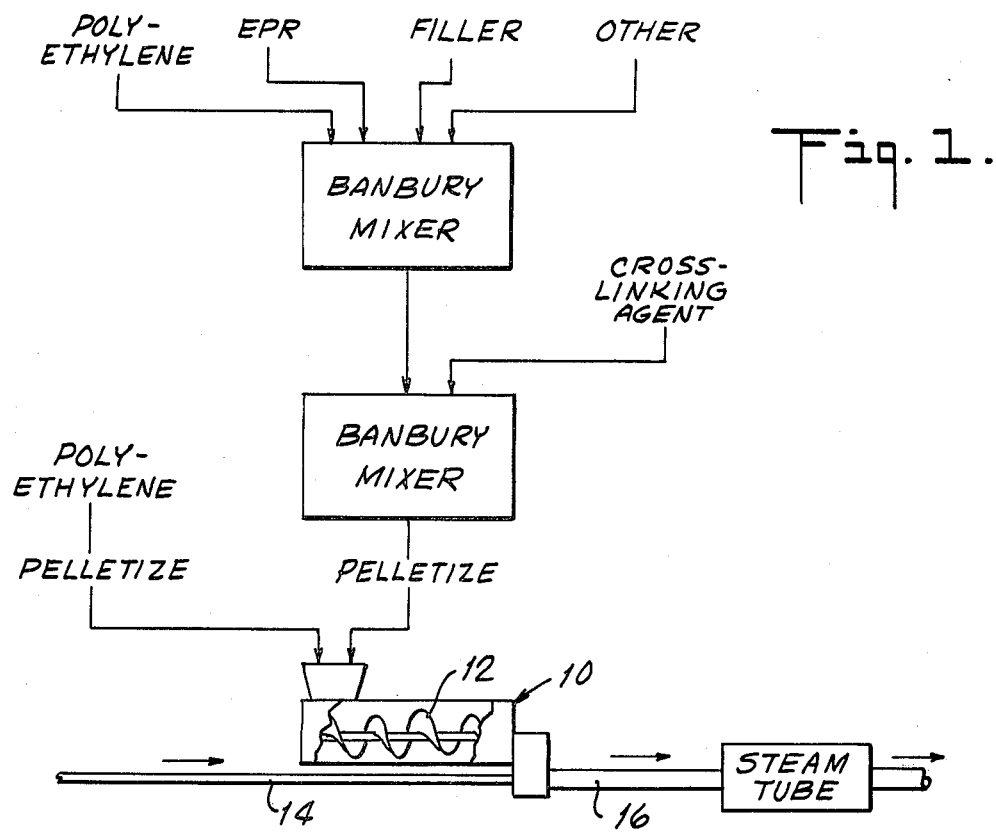
FIG. 1 is a flow diagram illustrating one embodiment of the method of the invention as used for coating cable.

Referring first to FIG. 1, the invention will be initially described as embodied in procedure for producing a polyethylene-based electrically insulating cable coating having a high (up to about 30%) loading of particulate non-conductive carbon black filler, such as is used for conductors having a rating of up to 600 volts.

In the first step of the method represented diagrammatically in FIG. 1, the carbon black and other additive material (except for cross-linking agent) to be incorporated in the final coating composition are charged to a Banbury mixer, together with an ethylene propylene rubber and a minor proportion of polyethylene. The "other" additive material commonly includes an antioxidant of a type conventionally used for polyethylene-based cable coatings, present in a proportion of e.g. 1 or 2%, and may also include, inter alia, minor proportions of such materials as red lead, zinc oxide, a processing agent such as zinc stearate or stearic acid, and/or an oil. Usually, for preparation of highly filler-loaded coatings, the carbon black is present in a larger proportion than any other single ingredient in the initial mixing step. As is conventional in such insulating coatings, a suitable particle size range for the carbon black is 201–500 nanometers.

The ethylene propylene rubber used in the initial mixing step is an EPR having an ethylene content of more than 50%; suitable currently commercially available examples of such EPR materials are copolymers, and terpolymers with a diene (EPDM), having an ethylene content above about 70%. To minimize consumption of EPR as well as to minimize the amount of material passed through the Banbury mixer, the amount of EPR supplied to the mixer in the initial mixing stage is preferably less than the amount of additive material (including the filler) present. A presently preferred range of ratios of additive material to EPR is between about 2:1 and about 5:1, or, more broadly, between about 1:1 and about 5:1.

The polyethylene added in the first mixing step constitutes part of the polymeric vehicle of the concentrate therein produced, i.e. together with the EPR. Preferably, again to minimize material throughput in the Banbury mixer, the amount of polyethylene present in this first mixing step is less than the amount of EPR present; e.g. the ratio of polyethylene to EPR in this step may be from about 4:5 to about 1:5 or even less. Indeed, the polyethylene may be omitted altogether from this step, though it is usually desirable to contribute to ease of mixing. In any event, the amount of polyethylene present is generally a small fraction (typically less than, and frequently much less than, one sixth) of the total polyethylene to be included in the final coating composition.

After the above-described ingredients, including polyethylene, EPR, carbon black filler and other additive material have been introduced to the Banbury mixer, the mixer is operated in conventional manner (with heating of the contained material so that the EPR and polyethylene become fluid) to effect uniform blending of these ingredients. A homogeneous concentrate of the filler and other additive material in the EPR-polyethylene vehicle is thereby produced.

This concentrate is discharged from the Banbury mixer at a temperature which may be as high as 320° F. (owing to the high-shear mixing action), screened (e.g. using a standard 80-mesh screen) to remove any unblended material. Subsequently, the concentrate is again introduced to a Banbury mixer together with a minor proportion of dicumyl peroxide (which is a cross-linking agent commercially available under the trade name "DiCup"), reheated, and mixed under controlled conditions to prevent the mixture temperature from rising above about 220° F., i.e. so as to ensure against premature curing. That is to say, in this second mixing step, the temperature of the material being mixed is kept below the range at which polyethylene and EPR are cured in the presence of the cross-linking agent. Typically, the amount of cross-linking agent added in this step is equal to about 5% or less of the weight of concentrate with which it is mixed.

The material discharged from the Banbury mixer after the second mixing step constitutes a master batch in accordance with the present method. This master batch is a homogeneous mixture of filler and other additive material (including cross-linking agent) in an EPR-polyethylene vehicle. Preferably, the initial proportions of ingredients are so selected that the additive material (principally carbon black filler) is a major proportion of the master batch, and the EPR is a major proportion of the polymeric vehicle which itself constitutes a minor proportion of the master batch. After cooling, the master batch is pelletized, e.g. in conventional manner, for introduction as homogeneous solid pellets to a cable-coating extruder. The pellets may be of any convenient size, one example of such size being about 3/16 inch in diameter.

Virgin polyethylene, also pelletized, is supplied, together with the pellets of master batch, to a generally conventional cable-coating extruder represented schematically at 10 in FIG. 1 and having a conventional feed or pumping screw 12. In charging the extruder, the amount of virgin polyethylene introduced is selected (in relation to the amount of master batch introduced) to provide the requisite proportion of polyethylene in the final coating composition. While there is ordinarily some polyethylene already present in the master batch, by far the greater proportion (typically substantially more than 80%) of the total polyethylene content of the final composition is introduced as virgin polyethylene directly to the extruder; and indeed, the major proportion of the charge to the extruder consists of virgin unblended polyethylene pellets.

Conveniently, the polyethylene pellets and master batch pellets are intermingled fairly uniformly before entering the extruder, and are delivered to the extruder screw as successive batches of intermingled pellets. Some care must be exercised in feeding the pellets to the extruder to prevent separation of the pellets (and consequent non-homogeneity of the produced coating), because the specific gravity of the master batch pellets is greater than that of the polyethylene pellets; the above-described successive or batchwise delivery of quantities of intermingled pellets adequately avoids undesired separation or segregation of pellets in the feed.

In the extruder, the pellets are heated to a temperature at which the master batch vehicle and virgin polyethylene become fluid (such temperature being, however, lower than the curing temperature), and are subjected to the mechanical working action of the pumping screw, incident to the ordinary, conventional operation of the extruder. This heat and working effect homogeneous blending of the master batch and virgin polyethylene to achieve uniform dispersion or incorporation of the additive material in the polymeric carrier. The screw forces the blended composition, which now constitutes the final coating composition, through a conventional die orifice (not shown) in surrounding relation to an advancing metal electrical conductor cable 14, thereby forming on the cable (i.e. as the cable emerges from the extruder) a uniform coating 16. From the extruder, the cable passes to and through a conventional curing chamber such as a steam tube, in which the coating is cured.

While supply of master batch and polyethylene in solid pellet form to the extruder, as described above, represents a convenient way of feeding these materials to conventional extruding equipment, in a broader sense they may be delivered for the blending step in any form (e.g. as powders, or even in a fluid condition) suitable for the blending equipment employed.

As will be appreciated, the extruding and curing equipment and operations may be in themselves entirely conventional, except that the feed of material to the extruder is heterogeneous (mingled polyethylene pellets and master batch pellets) rather than being homogeneous (pellets of uniformly premixed final coating composition) as in prior practice. In particular, the screw of the extruder may be an entirely conventional impeller as heretofore used solely to force the coating composition through the die orifice, and the step of blending the bulk of the polyethylene (introduced to the extruder as virgin, unblended polyethylene pellets) with the master batch may be performed incident to the normal operation of the screw, i.e. without requiring any special process conditions other than to insure a reasonably unsegregated supply of intermingled master batch pellets and polyethylene pellets to the extruder.

By the foregoing procedure, there is produced a polyethylene-based insulating coating for electrical conductor cable, comprising a major proportion (i.e. more than 50%) of polyethylene and minor proportions of carbon black filler and other additive material. This coating is equivalent, in homogeneity and other properties, to coatings conventionally produced from coating compositions which are fully mixed in a Banbury mixer before being supplied to an extruder; yet, in contrast to conventional practice, less than half of the final coating material ever passes through a Banbury mixer, the major proportion of the coating composition being delivered as virgin polyethylene pellets directly to the extruder, without any premixing.

It will be understood that in the described method, the ethylene propylene rubber functions essentially as a processing agent, to enable homogeneous blending (of the filler and other additive material with the bulk of the polyethylene) by the extruder screw. In the final composition, the EPR is present only as a very minor constituent (typically one sixth or less) of the polymeric carrier, which is predominantly polyethylene. That is to say, the present invention uses a small amount of an EPR as a processing agent in a concentrate or master batch of additive material to realize substantial savings in overall processing costs by effecting a reduction of more than 50% (or even more than 60%) in the amount of material that must be mixed in a Banbury mixer to produce a given amount of cable coating.

Merely by way of illustration, the following table indicates exemplary relative proportions of ingredients for two compositions (A and B) prepared in accordance with the present invention as embodied in the method represented in FIG. 1:

| | Approximate Percent by Weight | | |
|---|---|---|---|
| | Master Batch | Feed to Extruder | Final Composition |
| Composition A | | | |
| EPR | 27.6 | — | 12.0 |
| Polyethylene | 20.7 | — | 65.5 |
| Carbon black | 46.0 | — | 20.0 |
| Anti-oxidant | 1.1 | — | 0.5 |
| Cross-linking agent | 4.6 | — | 2.0 |
| Master batch | — | 43.5 | — |
| Virgin polyethylene | — | 56.5 | — |
| Composition B | | | |
| EPR | 24.8 | — | 11.5 |
| Polyethylene | 8.0 | — | 57.5 |
| Carbon black | 62.0 | — | 28.6 |
| Anti-oxidant | 1.0 | — | 0.5 |
| Cross-linking agent | 4.2 | — | 1.9 |
| Master batch | — | 46.2 | — |
| Virgin polyethylene | — | 53.8 | — |

It will be noted that in Composition A above, the EPR constitutes 15.5% of the final polymeric vehicle, 86.3% of the polyethylene being added in the final blending step; and in Composition B, the EPR constitutes 16.7% of the final polymeric vehicle, and 93.6% of the polyethylene is added in the final blending step.

It will be understood, of course, that the foregoing compositions are merely illustrative; for example, in other instances of practice of the method, the proportion of virgin polyethylene fed to the extruder has exceeded two thirds of the total composition.

Figure 2:
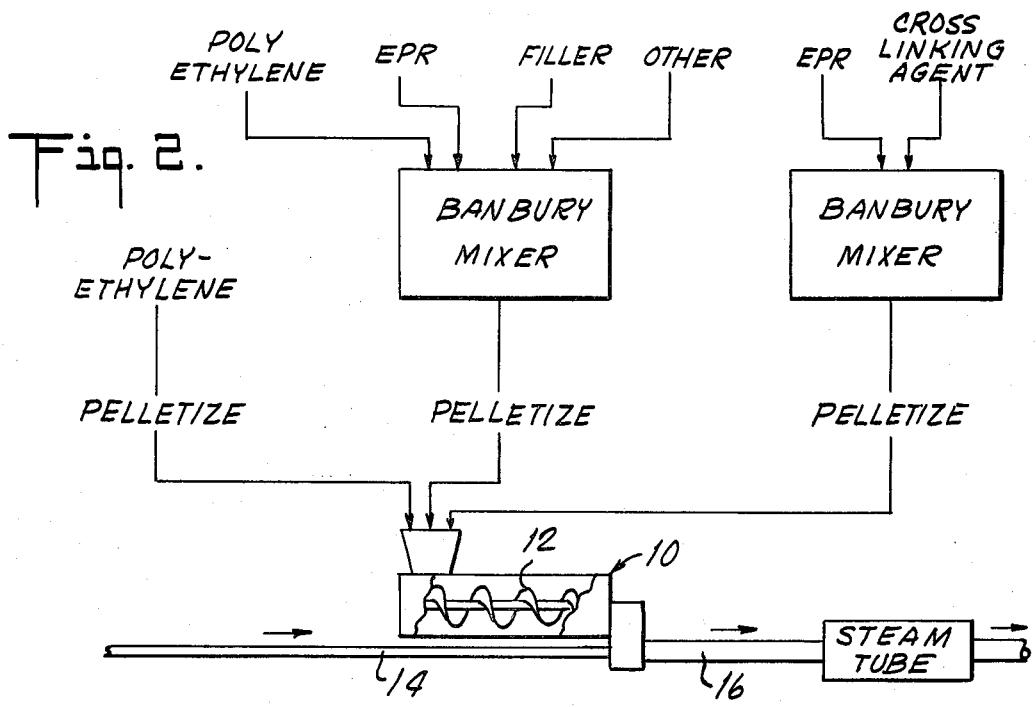
FIG. 2 is a similar diagram illustrating another embodiment of the cable-coating method of the invention.

FIG. 2 represents a modified embodiment of the method of the invention, again as applied to the production of insulating coating for cable. In this embodiment, the initial step of preparing a homogeneous concentrate of filler and other additive material in a vehicle comprising an ethylene propylene rubber and a minor proportion of polyethylene by mixing these ingredients in a Banbury mixer may be identical to that described above with reference to FIG. 1. In FIG. 2, however, this concentrate constitutes a final master batch; i.e. the cross-linking agent (dicumyl peroxide) is not added to the concentrate in a subsequent mixing step, but is established in a second, separate master batch, using a small amount of the same ethylene propylene rubber as a vehicle (optionally also including some polyethylene) again by mixing in a Banbury mixer but under conditions that do not raise the temperature of the material being mixed into the curing range. After these two master batches have been separately mixed, they are individually pelletized for introduction to the extruder 10 in appropriate relative proportions together with a major proportion of virgin polyethylene pellets, for blending by the extruder screw. As in the case of the FIG. 1 method, the pellets of the two master batches and the virgin polyethylene are delivered concurrently to the extruder in commingled batches.

A virtue of the FIG. 2 embodiment is that it permits still further reduction in the amount of material required to be handled by a Banbury mixer for production of a given amount of final coating composition, in cases where a cross-linking agent is used. In FIG. 1, virtually the entire master batch is put through a Banbury mixer twice, first to establish the basic concentrate and then to add the cross-linking agent. In FIG. 2, however, the principal concentrate is introduced to a Banbury mixer only once, and the amount of the second, separately-mixed master batch (containing the cross-linking agent) incorporated in a given quantity of final coating composition is small in relation to the amount of the first or main master batch thus incorporated.

As may be understood from consideration of FIG. 2, the present method affords the coated-cable producer great flexibility in selecting relative proportions of ingredients for particular coatings. Simply by adjusting the proportions of pellets of the two master batches and polyethylene to be included in the feed to the extruder, such factors as the extent of loading with filler may be varied as desired. For example, to produce a non-cross-linked coating, the step of preparing the second master batch (represented at the righthand side of FIG. 2) is simply omitted; in such case, the feed to the extruder simply comprises commingled pellets of the main master batch and pellets of virgin polyethylene. On the other hand, it is sometimes desired to produce an unfilled but cross-linked coating wherein the only additive material is the cross-linking agent. The step of preparing the main master batch is then omitted; i.e. the pellets of the main or first master batch are omitted from the feed to the extruder, which thus consists of commingled pellets of the second master batch and pellets of virgin polyethylene.

The operation of the Banbury mixer, in performance of the various master-batch mixing steps described above, may be wholly conventional. In particular, the selection of operating conditions for providing high-shear mixing (in the initial step of mixing the concentrate) or limiting the finish temperature of the material being mixed (when a cross-linking agent is present) in a Banbury mixer will be readily apparent to one skilled in the art, and accordingly need not be described in detail. It will also be understood that the term "homogeneous" is used herein in its conventional sense in the cable-coating art, to mean homogeneous in a microscopic sense. Slices of cable coatings produced in accordance with FIG. 1, under microscopic examination, have exhibited a degree of homogeneity characterized by the presence of not more than three contaminants per square inch (the term "contaminants" being used herein to designate particles at least one mil in size) and no contaminants larger than about two mils; this level of homogeneity is fully acceptable for insulating coating purposes.

Stated generally, the proportion of polymeric vehicle (EPR, with or without polyethylene) to be incorporated in a master batch in accordance with the invention is that proportion which is effective to establish and maintain a homogeneous dispersion or blend of the additive material with which it is mixed, e.g. when solidified and pelletized. More particularly, the proportion of EPR to be included in such vehicle is that which is effective to enable attainment of homogeneous blending of the master batch with virgin polyethylene by the low-shear blending action of an extruder screw or the like. Among the advantages of use of an ethylene propylene rubber of the type hereinabove described as a processing agent to facilitate blending of additive material in polyethylene are its compatibility with polyethylene in mixing temperatures and the fact that it is curable with the same cross-linking agent (dicumyl peroxide) used for polyethylene.

Proportions of other ingredients (e.g. anti-oxidants and cross-linking agents) used may be selected in accordance with conventional practice, i.e. these proportions may be the same as in conventional polyethylene-based cable-coating compositions.

While the invention has been described as embodied in procedures for producing carbon-black-filled insulating coatings for cable, it will be appreciated that in its broader aspects the present method may also be employed to produce coatings having other fillers (e.g. clay), or no filler, and coatings in which the polymeric carrier is not cross-linked, as well as semiconductive coatings e.g. containing a conductive carbon black, and polyethylene-based products other than cable coatings, such as extruded and injection-molded products which are formed in shaping equipment having an extruder screw or the like for performing the final blending step. That is to say, the invention is broadly applicable to procedures for incorporating additive materials generally in polyethylene-based compositions, regardless of the specific nature of the additive material or the particular end use to which the composition is put.

By way of further illustration, reference may be made to the following specific examples of production of insulating cable coatings in accordance with the invention:

EXAMPLE I

The following ingredients were used to prepare a series of insulating coating compositions for cable (manufacturer's name indicated in parentheses):

ethylene propylene rubber: Nordel 2722 (DuPont), an ethylene propylene diene terpolymer (EPDM) having an ethylene content between about 70 and about 75%;

polyethylene: LDPE 400 (Exxon), a homopolymer, or EVA 401 (Exxon), a copolymer with ethylene vinyl acetate;

filler: Thermax N990 nonconductive carbon black;

anti-oxidant: AgeRite resin D, which is polymerized trimethyl dihydroquinoline;

oil: Sunpar 2280 cross-linking agent: DiCup R (Hercules) dicumyl peroxide.

In accordance with the invention, four master batches were first prepared by mixing ingredients as follows with high mechanical shearing action in a Banbury mixer until a homogeneous concentrate was obtained:

|  | Master Batch (parts by weight) | | | |
| --- | --- | --- | --- | --- |
|  | 1 | 2 | 3 | 4 |
| Nordel 2722 | 37.60 | 37.51 | 37.60 | 37.51 |
| LDPE 400 | 28.18 | 12.15 | 23.49 | 7.46 |
| Carbon black | 62.65 | 93.78 | 62.65 | 93.78 |
| AgeRite Resin D | 1.56 | 1.47 | 1.56 | 1.47 |
| Sunpar 2280 | — | — | 4.69 | 4.69 |
| Specific gravity | 1.185 | 1.325 | 1.185 | 1.325 |

The four concentrates were then mixed with DiCup R in the following proportions to produce final master batches:

| Master Batch | | |
| --- | --- | --- |
| No. | Parts by Wt. | DiCup R Parts by Wt. |
| 1 | 498 | 24 |
| 2 | 531 | 23 |
| 3 | 498 | 24 |
| 4 | 531 | 23 |

These final master batches were solidified and pelletized, and the resultant pellets were commingled with pellets of virgin polyethylene and charged to the screw of a conventional cable-coating extruder to produce a series of eight final coating compositions, viz.:

| Master Batch | | | Polyethylene | |
| --- | --- | --- | --- | --- |
| Composition | No. | Parts by Wt. | Type | Parts by Wt. |
| A* | 1 | 522 | LDPE 400 | 678 |
| B* | 2 | 554 | LDPE 400 | 646 |
| C | 3 | 522 | LDPE 400 | 678 |
| D | 4 | 554 | LDPE 400 | 646 |
| E | 1 | 522 | EVA 401 | 678 |
| F | 2 | 554 | EVA 401 | 646 |
| G | 3 | 522 | EVA 401 | 678 |
| H | 4 | 554 | EVA 401 | 646 |

*Same as compositions A and B referred to above.

In each case, the pellets were fed to the extruder in successive batches of mingled pellets, each batch being about 1 ft.$^3$ in volume, through a pellet-mingling device mounted directly above the extruder screw so that the mingled pellets would not become segregated during transit to the extruder. The pellets became fluid by heating in the extruder, blended by the action of the extruder screw, and the resultant blended compositions were extruded onto #6 solid soft drawn copper conductor wire to form insulating coatings 0.045 inch thick. All the coatings thus produced were found to be satisfactorily homogeneous. After being cured (by passing the coated wire through a steam tube), the coatings had the following properties:

| Properties | Coating Composition | | | | | | | |
| --- | --- | --- | --- | --- | --- | --- | --- | --- |
|  | A | B | C | D | E | F | G | H |
| Before Aging | | | | | | | | |
| tensile strength (psi) | 2500 | 2510 | 2430 | 2290 | 2430 | 2980 | 2730 | 2930 |
| elongation (%) | 360 | 430 | 360 | 370 | 380 | 450 | 380 | 400 |
| After circulating air oven aging 14 days at 150° C. | | | | | | | | |
| % retention of tensile strength | 102 | 99 | 110 | 112 | 99 | 102 | 102 | 91 |
| % retention of elongation | 94 | 87 | 88 | 89 | 80 | 94 | 85 | 77 |
| Average heat distortion (%) | 10 | 15 | 9 | 11 | 11 | 11 | 7 | 8 |
| Hot modulus at 150° C. | | | | | | | | |

-continued

| Properties | Coating Composition | | | | | | | |
|---|---|---|---|---|---|---|---|---|
| | A | B | C | D | E | F | G | H |
| (psi) | 62 | 37 | 71 | 58 | 51 | 65 | 89 | 80 |
| Cure (%) | 86 | 80 | 82 | 89 | 89 | 88 | 94 | 91 |

The extruder used in the foregoing example was a "Spirobe" model extruder manufactured by John Royle and Son, Paterson, N.J., having a 4½-inch diameter screw chamber with a screw length to chamber (inner) diameter ratio of 20:1.

EXAMPLE II

A series of homogeneous master batches were prepared, each containing (in parts by weight) 487 parts of ethylene propylene rubber, 123 parts of polyethylene, 50.2 parts of AgeRite Resin D, 95.6 parts of DiCup R cross-linking agent, 25 parts of a processing agent, and other ingredients specified below.

Eight of these master batches (numbered 5 through 12) had the following specific features of composition:

| | Identification of Ingredients | | |
|---|---|---|---|
| Master Batch # | EPR | Polyethylene | Processing Agent |
| 5, 6, 7 and 8 | Nordel 2722 | LDPE 400 | Silane A-172 |
| 9, 10, 11 and 12 | Vistalon 707[1] | EVA 401 | TAC[2] |

[1]An ethylene propylene copolymer manufactured by Exxon Chemical Company and having an ethylene content in the range of about 70-75%
[2](75% dry mix), a dispersion of triallyl cyanurate on microcel

| | Mater Batch (parts by weight) | | | |
|---|---|---|---|---|
| Further Additives | 5 & 9 | 6 & 10 | 7 & 11 | 8 & 12 |
| Thermax N990 Carbon Black | 306 | 565.3 | 547.6 | 386.9 |
| KE Clay Burges | 306 | — | — | 306 |
| Zinc Oxide M.B.[3] | 153 | — | 153 | — |
| Red Lead M.B.[4] | 153 | 153 | — | — |

[3]A master batch comprising 75% zinc oxide in styrene-butadiene rubber.
[4]A master batch comprising 90% red lead in EPR.

The other eight master batches (numbered 13 through 20) differed from Nos. 5-12 in having the following features:

| | Identification of Ingredients | | |
|---|---|---|---|
| Master Batch # | EPR | Polyethylene | Processing Agent |
| 13, 14, 15 & 16 | Nordel 2722 | EVA 401 | Silane A-172 |
| 17, 18, 19 & 20 | Vistalon 707 | LDPE 400 | TAC |

| | Master Batch (parts by weight) | | | |
|---|---|---|---|---|
| Further Additives | 13 & 17 | 14 & 18 | 15 & 19 | 16 & 20 |
| Thermax N990 | 516 | 355.3 | 337.6 | 596.9 |
| KE Clay Burges | — | 306 | 306 | — |
| Zinc Oxide M.B. | 153 | — | 153 | — |
| Red Lead M.B. | 153 | 153 | — | — |

These sixteen master batches ranged in specific gravity from 1.17 (master batches 16 and 20) to 1.43 (master batches 5 and 9).

The sixteen master batches described above were pelletized, commingled with pellets of virgin polyethylene, and blended to produce thirty-two final coating compositions. Two final coating compositions were produced with each master batch, one containing 800 parts by weight of LDPE 400 polyethylene, the other containing 800 parts by weight of EVA 401 polyethylene. The amount of master batch used, and the specific gravities of the resultant final coating compositions, were as follows:

| Master Batch | Parts by Weight (mixed with 800 parts by wt. polyethylene) | Specific Gravity (final composition) |
|---|---|---|
| 5 & 9 | 422 | 1.049 |
| 6 & 10 | 376 | 1.011 |
| 7 & 11 | 372 | 1.006 |
| 8 & 12 | 370 | 1.004 |
| 13 & 17 | 402 | 1.032 |
| 14 & 18 | 400 | 1.031 |
| 15 & 19 | 395 | 1.026 |
| 16 & 20 | 346 | 0.983 |

It is to be understood that the invention is not limited to the features and embodiments hereinabove specifically set forth, but may be carried out in other ways without departure from its spirit.

I claim:

1. In a method of producing, on electrical conductor cable, a cured, electrically insulating coating of filled polyethylene comprising the steps of,
   (a) extruding, from an extruder having a feed screw, onto a conductor cable, a curable coating composition comprising polyethylene and inert particulate filler material and containing at least about 50% by weight polyethylene, and
   (b) curing the extruded coating in the presence of a cross-linking agent to produce said cured, electrically insulating coating on the cable,
   the improvement which comprises:
   admixing, at the extruder screw, at least a major portion of the polyethylene and a pre-established substantially homogeneous mixture of the filler material and an amount of an ethylene propylene rubber, effective to enable substantially homogeneous dispersion of the filler material in the polyethylene by the action of the extruder screw, said rubber having an ethylene content above 50%, the ratio of said filler material to said rubber, in parts by weight, being between about 1:1 and 5:1.

2. A method according to claim 1, wherein said pre-established mixture contains polyethylene in an amount less than the amount of said rubber present therein.

3. A method according to claim 1, wherein the quantity of polyethylene admixed with said pre-established mixture by said extruder screw is at least about equal to the quantity of said pre-established mixture supplied to the screw.

4. A method according to claim 1, wherein a cross-linking agent is incorporated in said pre-established mixture.

5. A method according to claim 1, wherein said filler material is carbon black.

6. A method of producing, on electrical conductor cable, a cured, electrically insulating coating of filled polyethylene comprising the steps of, (a) admixing, in an extruder having a feed screw, at least a major portion of the polyethylene and an inert particulate filler material in the presence of an amount of an ethylene propylene rubber, effective to enable substantially homogeneous dispersion of the filler material in the polyethylene by the action of the extruder screw for producing a curable coating composition, said rubber having an ethylene content above 50%, the ratio of said filler material to said rubber, in parts by weight, being between about 1:1 and about 5:1, and said composition containing at least about 50% by weight polyethylene, said filler material and said rubber being supplied to the screw in a pre-established, substantially homogeneous mixture, (b) extruding onto said conductor cable, said curable coating composition and (c) curing the extruded coating in the presence of a cross-linking agent to produce said cured, electrically insulating coating on the cable.

7. A method according to claim 6, wherein said pre-established mixture contains polyethylene in an amount less than the amount of said rubber present therein.

8. A method according to claim 6, wherein the quantity of polyethylene admixed with said pre-established mixture by said extruder screw is at least about equal to the quantity of said pre-established mixture supplied to the screw.

9. A method according to claim 6, wherein a cross-linking agent is incorporated in said pre-established mixture.

10. A method according to claim 6, wherein said filler material is carbon black.

* * * * *